United States Patent Office 3,454,551
Patented July 8, 1969

3,454,551
TRIAZINE CONTAINING AZO DYESTUFFS
Angelo Mangini, Germana Mazzanti, and Antonio Tundo, Bologna, Italy, assignors to Aziende Colori Nazionali Affini ACNA S.p.A., Milan, Italy
No Drawing. Filed June 1, 1964, Ser. No. 371,786
Claims priority, application Italy, June 5, 1963, 11,724/63
Int. Cl. C09b 62/44, 62/82
U.S. Cl. 260—153                    10 Claims

ABSTRACT OF THE DISCLOSURE

Dyestuffs containing the reactive radical:

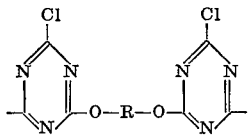

wherein R is a hydrocarbon radical, benzene nucleus, or a substituted benzene nucleus.

---

Our invention relates to a new class of reactive dyestuffs, and more particularly to dyestuffs capable of forming, during dyeing, chemical bonds with the hydroxyl groups of cellulose, thereby yielding dyeing particularly fast to the wet treatments.

Our new class of dyestuffs contains the reactive radical (I):

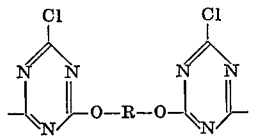

wherein R is a hydrocarbon radical, benzene nucleus, or a substituted benzene nucleus.

The dyestuffs of our invention are prepared by reacting cyanuric chloride with a compound containing 2 alcoholic or phenolic hydroxyl groups and then condensing the product (II) obtained with variously substituted aromatic diamines, according to the reactions:

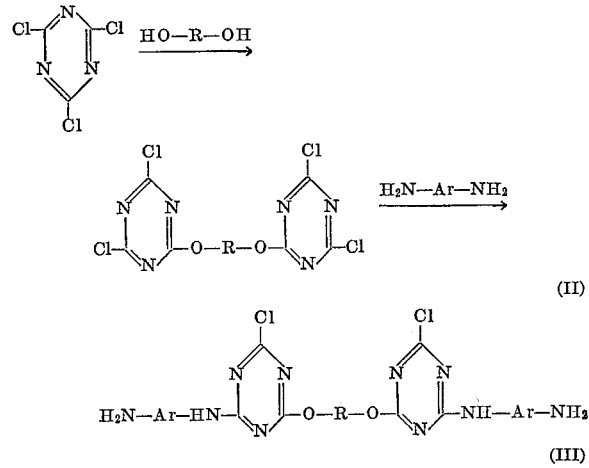

wherein Ar is selected from the group consisting of substituted benzene, naphthalene, and diphenyl nucleus and R has the above defined meaning. By diazotation of the amine (III) and coupling with different coupling agents, reactive dyestuffs having the structure (IV):

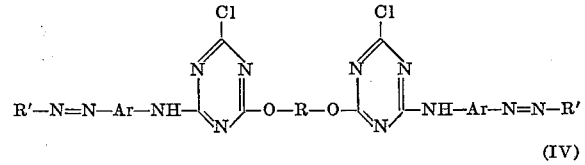

wherein Ar and R have the above-defined meaning and R' is a residue of sulphonated pyrazolone derivatives, sulphonated naphthylamines, sulphonated naphthols, sulphonated amino-naphthols, etc. are obtained.

The reactive dyestuffs of our invention can alternatively be prepared by condensing the derivative (II) with differently substituted amino-naphthols according to the reaction:

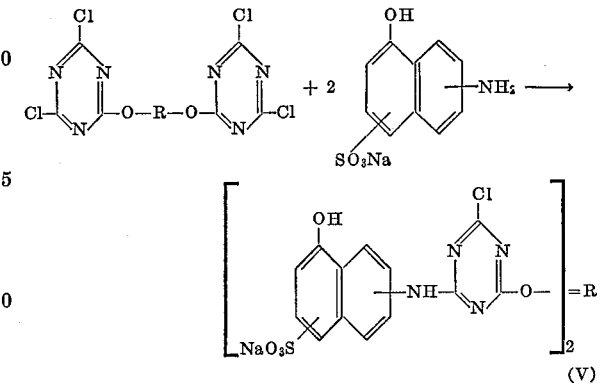

then coupling the naphthol (V) with different diazonium salts to yield reactive dyestuffs (VI):

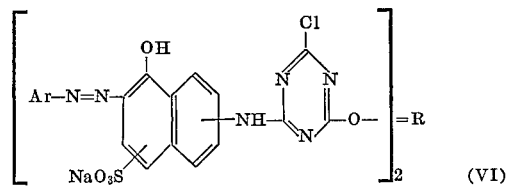

wherein Ar is a differently substituted benzene, naphthalene or diphenyl nucleus and R has the above defined meaning.

The derivative (II) can, by another alternative, be directly condensed with the azo dyestuffs, with Cu-phthalocyanine dyestuffs or with sulphonated anthraquinone dyestuffs, containing a free amino group to yield directly the reactive dyestuffs (VII):

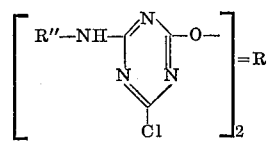

wherein R" is a generic colored residue (for instance an azo- or sulphonated anthraquinone residue, etc.) and R' has the above-defined meaning.

All of the reactive dyestuffs of the class described above dye cellulose fibers in the presence of electrolytes, from an alkaline bath.

The following examples illustrate the present invention and are not in any way to be limitative either for the products or the dyeing process.

EXAMPLE 1

Preparation of the amine 0.2 mol of collidine and 0.1 mol of ethylene glycol, dissolved in 120 cc. acetone, were added to a solution of 0.2 mol of cyanuric chloride in 280 cc. acetone. The cyanuric chloride was cooled with ice and the addition of collidine and ethylene glycol was at a rate so as to maintain the reaction mixture at about 10° C. At the termination of the addition, the whole was boiled for 12 hours on a water bath. After cooling, the hydrochloride was separated from the collidine by filtration.

The acetone solution was then poured, under agitation, into 500 grams of crushed ice. The condensation product between the ethylene glycol and the cyanuric chloride was thus prepared; this condensation product, when crystallized from ligroin, melts at 142–143° C.

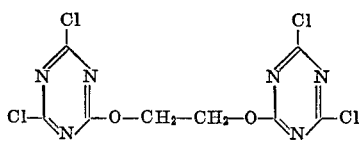

0.01 mol of the condensation product between ethylene glycol and the cyanuric chloride was dissolved in 35 cc. acetone and the solution was poured into water and ice (40 parts of ice and 40 cc. H$_2$O). The neutral solution of 0.02 mol of sulphonated m-phenylendiamine in 120 cc. of water containing 0.02 mol of sodium acetate was added, under vigorous agitation, to the suspension obtained. The whole was agitated for 4 hours at 40–45° C. to give a diamine having the structure:

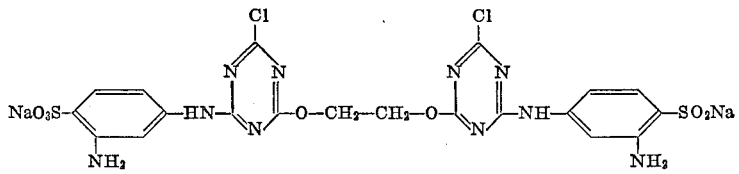

Preparation of the dyestuff

To the aqueous solution of the amine obtained above was added 0.09 mol of concentrate HCl diluted with 10 cc. of water. This was diazotized with 0.02 mol of NaNO$_2$ at 5–10° C. After removal of excess NaNO$_2$, the diazonium salt was added under agitation to the alkaline solution (Ph of 8) of 0.02 mol of K-benzoyl acid in 50 cc. of water. During addition of the diazonium salt, the temperature of the solution containing the coupling agent was kept between 4 and 6° C. and the pH was maintained between 8 and 8.5 by suitable additions of 10% NaOH. The reaction mass was agitated for 4–5 hours after which the pH was brought to 7.3. The mass was salted with NaCl and the precipitate, collected by centrifuging, was dried at 40° C.

The dyestuff thus obtained had the structure:

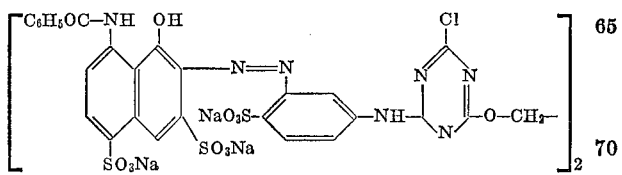

and dyed cotton a fast red shade.

EXAMPLE 2

By proceeding as in Example 1, but using as the coupling agent 1-(2′,5′-dichloro-4′-sulpho)-phenyl-3-methyl-5-pyrazolone, a dyestuff of the structure:

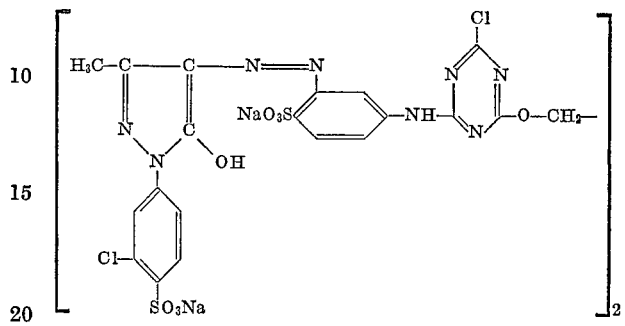

which dyes cotton a fast brilliant yellow shade, was obtained.

EXAMPLE 3

0.01 mol of the condensation product between ethylene glycol and cyanuric chloride, obtained as described in Example 1, was dissolved in 40 cc. acetone and the solution was poured in water and ice mixture (50 cc. water and 50 g. ice). The neutral solution of 0.02 mol of isogamma acid in 120 cc. of water containing 0.02 mol of sodium acetate was added under vigorous agitation to the suspension obtained. The reaction mass was agitated for 10 hours at 40–45° C. A solution containing the condensation product with the structure:

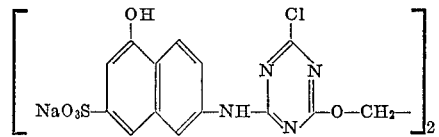

was obtained.

0.02 mol of m-amino-benzoic acid was diazotized at 5–6° C. and the diazonium salt was poured dropwise in the solution neutralized with 10% Na$_2$CO$_3$ (pH of 8) of the condensation product obtained as described above. During the diazonium salt addition, the temperature of the solution of the coupling agent was maintained between 4 and 6° C. and the pH between 8 and 8.5 by suitable additions of 10% NaOH. The reaction mass was agitated for 4–5 hours and the pH was then brought to 7.3. The mass was salted with NaCl and the precipitate, collected by centrifuging was dried at 40° C. The dyestuff obtained has the structure:

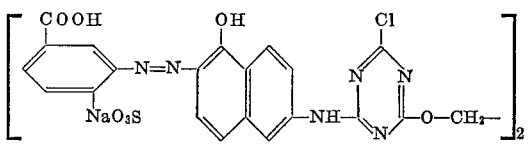

and dyes cotton an orange shade fast to wet treatments.

EXAMPLE 4

By proceeding as described in the preceding example but using the diazonium salt of the Tobias acid as coupling agent, the dyestuff:

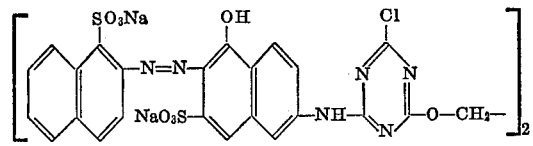

which dyes cotton an orange shade fast to wet treatments, was obtained.

EXAMPLE 5

By proceeding as described in Examples 3 and 4, but using the diazonium salt of the 1-amino-4-acetylamino-2-sulpho-benzene as the dyestuff with coupling agent, the structure:

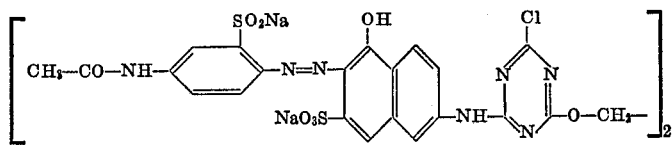

which dyes cotton a scarlet shade fast to wet treatments, was obtained.

EXAMPLE 6

0.2 mol of collidine and 0.1 mol of resorcin, dissolved in 200 cc. acetone were added by cooling in ice to a solution of 0.2 mol of cyanuric chloride in 280 cc. acetone at a rate so as to maintain the reaction mixture at about 10° C. At the end of the collidine and resorcin addition, the mass was agitated for 5 hours at 20° and then for 2 hours at 50–55° C. The whole was cooled and the collidine hydrochloride was filtered off.

The acetone solution was then poured, under agitation into 500 g. of crushed ice. A yellow-orange product was separated; it was crystallized with ligroin (M.P. 141–143° C.) and has the following structure:

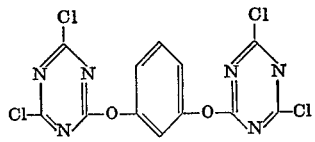

0.01 mol of this product was dissolved in 40 cc. acetone and the solution was poured in water and ice (50 cc. water and 50 g. ice). The neutral solution of 0.02 mol of sulphonated m-phenylendiamine and 0.02 mol of sodium acetate in 100 cc. water was added under vigorous agitation to the suspension thus obtained. The mass was agitated for 4 hours at 40–45° C. An aqueous solution of the following product:

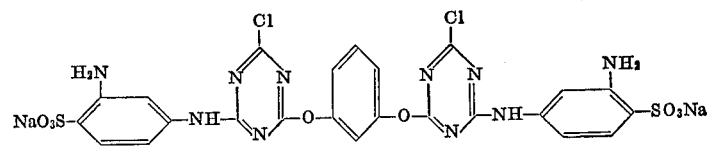

was obtained which, after neutralization with 10% sodium carbonate, and the addition of 0.09 mol of concentrate HCl diluted with 10 cc. water, was diazotized at 5–10° C. with 0.02 mol of sodium nitrite. After removal of the NaNO₂ excess, the diazonium salt was added under agitation to the alkaline solution (pH=8) of 0.03 mol of K-benzoyl acid in 60 cc. water. During the addition of the diazonium salt, the temperature of the solution containing the coupling agent was maintained between 4 and 6° C. and the pH between 8 and 8.5 by suitable addition of 10% NaOH. The reaction mass was kept under agitation for 4–5 hours and then the pH was adjusted to 7.3. The mass was salted with NaCl and the precipitate collected by centrifuging was dried at 40° C. The dyestuff dyes cotton a red shade fast to laundering and has the structure:

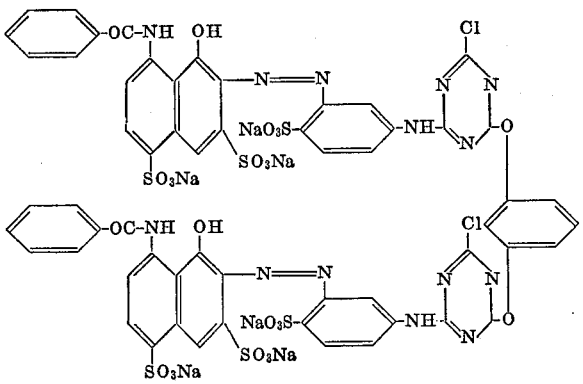

EXAMPLE 7

The following dyestuff:

was obtained by proceeding as in Example 6, but using the N-acetyl-isogamma acid as the coupling agent. It dyes cotton an orange brown shade fast to laundering.

EXAMPLE 8

0.01 mol of the previously described condensation product between cyanuric chloride and resorcin was dissolved in 40 cc. acetone and the solution was poured in water and ice (50 cc. water and 50 g. ice). A solution of 0.02 mol of isogamma acid and 0.02 mol of sodium acetate in 100 cc. water was added under vigorous agitation to the suspension thus obtained. The whole was agitated for 7 hours at 40–45° C. A solution of:

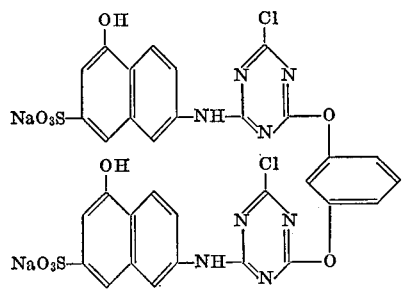

was obtained which, after neutralization with 10% Na₂CO₃, was used for the preparation of the dyestuff:

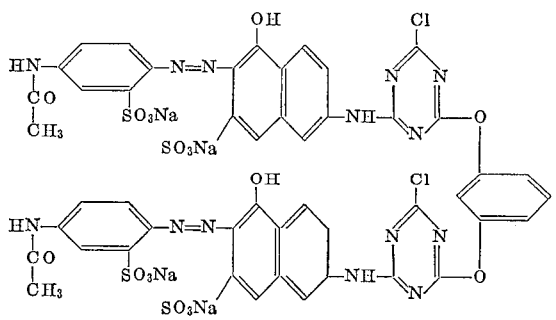

0.02 mol of sulphonated p-aminoacetoanilide in 15 cc. water was added at 5° C. to 0.09 mol of HCl diluted with 10 cc. water. The whole was diazotized between 5 and 8° C. with a solution of 0.02 mol of NaNO₂ in 10 cc. water. The suspension of the diazonium salt was added to the alkaline solution (pH=8) of the product obtained as described above. During addition of diazonium salt, the temperature of the solution containing the coupling agent was maintained between 4 and 6° C. and the pH between 8 and 8.5 by suitable additions of 10% NaOH. The reaction mass was agitated for 4–5 hours and then the pH was brought to 7.3. The reaction mass was salted with NaCl and the precipitate, collected by centrifuging, was dried at 40° C. The dyestuff dyes cotton a scarlet shade fast to washing.

EXAMPLE 9

The dyestuff:

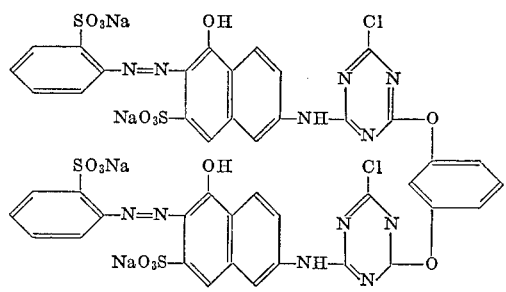

was obtained similarly to Example 8, using o-amino-benzene-sulphonic acid as the diazonium salt. It dyes cotton a brilliant orange shade possessing excellent fastness to washing.

EXAMPLE 10

The dyestuff:

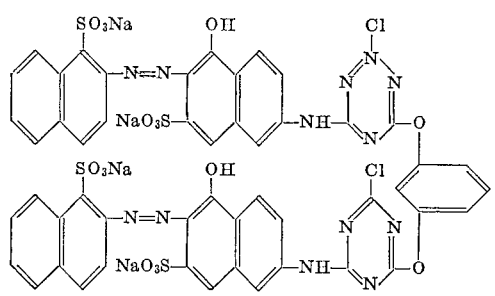

was obtained by proceeding as in Example 8 but using the diazonium salt of Tobias acid, and dyes cotton an orange shade possessing excellent fastness to wet treatments, such as washing.

We claim:

1. A dyestuff of the formula:

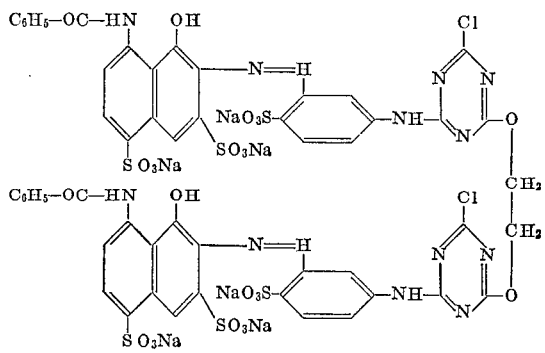

2. A reactive dyestuff of the formula:

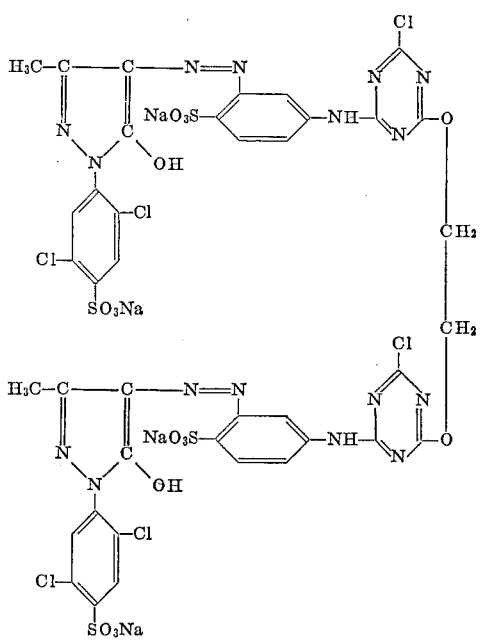

3. A reactive dyestuff of the formula:

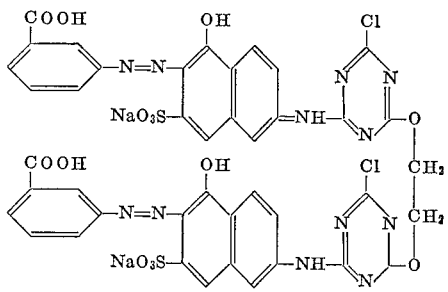

4. A reactive dyestuff of the formula:

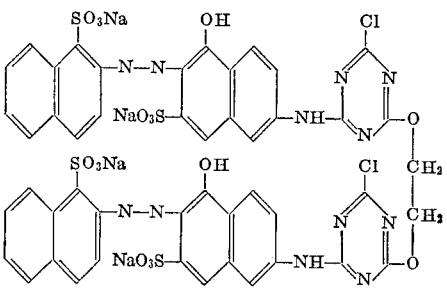

5. A reactive dyestuff of the formula:
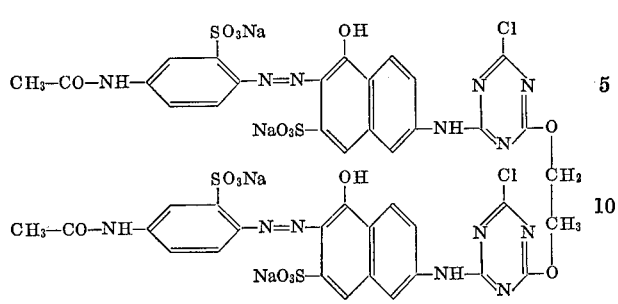
6. A reactive dyestuff of the formula:
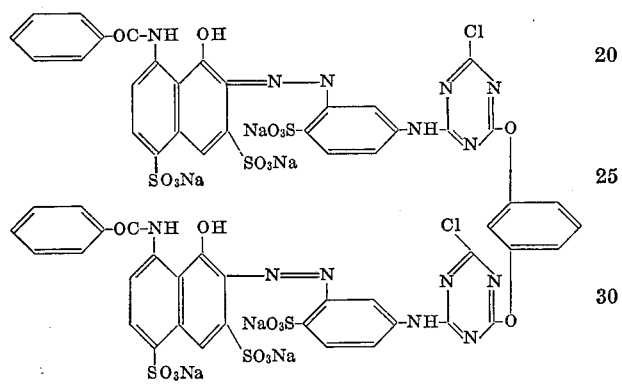
7. A reactive dyestuff of the formula:
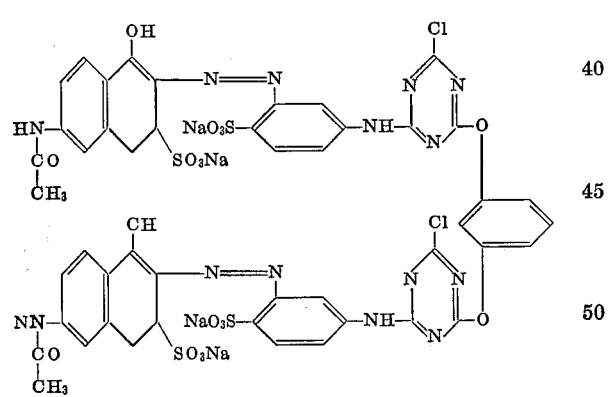
8. A reactive dyestuff of the formula:
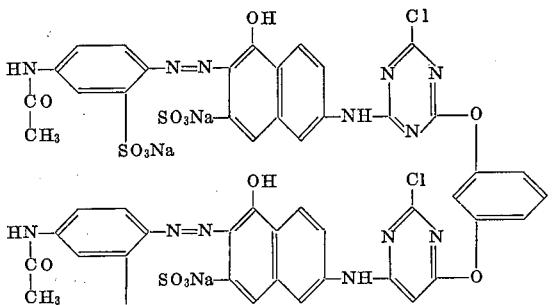
9. A reactive dyestuff of the formula:
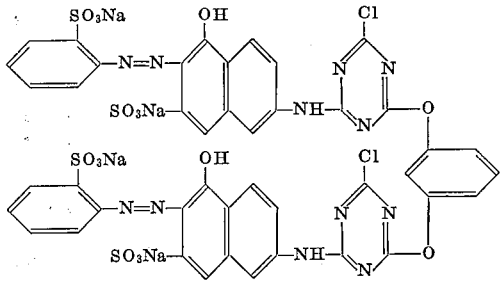
10. A reactive dyestuff of the formula:
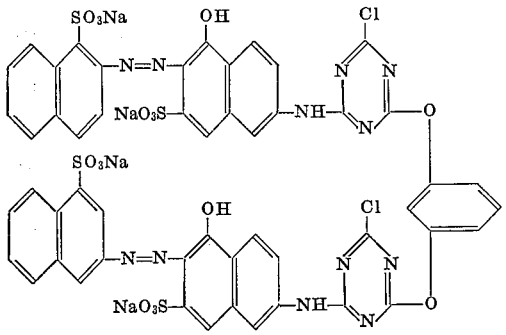
References Cited
UNITED STATES PATENTS
2,795,576  6/1957  Fasciati _____ 260—153
FLOYD D. HIGEL, *Primary Examiner.*
DONALD M. PAPUGA, *Assistant Examiner.*
U.S. Cl. X.R.
8—41, 50, 54.2; 260—242, 248, 249, 249.5, 249.8